United States Patent
Brown et al.

(10) Patent No.: US 7,336,296 B2
(45) Date of Patent: Feb. 26, 2008

(54) SYSTEM AND METHOD FOR PROVIDING POSITION-INDEPENDENT POSE ESTIMATION

(75) Inventors: Lisa Marie Brown, Pleasantville, NY (US); Rudolf M. Bolle, Bedford Hills, NY (US); Jonathan H. Connell, Cortlandt Manor, NY (US); Arun Hampapur, Fairfield, CT (US); Sharathchandra Pankanti, Mount Kisco, NY (US); Andrew William Senior, New York, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 10/683,334

(22) Filed: Oct. 10, 2003

(65) Prior Publication Data

US 2005/0078178 A1    Apr. 14, 2005

(51) Int. Cl.
 *H04N 7/18* (2006.01)
(52) U.S. Cl. ................................ 348/139; 348/135
(58) Field of Classification Search ............ 348/30–70
See application file for complete search history.

(56) References Cited

U.S. PATENT DOCUMENTS 5,500,671 A * 3/1996 Andersson et al. ........ 348/14.1
5,566,251 A * 10/1996 Hanna et al. ................ 382/284
5,930,378 A * 7/1999 Kubota et al. ............... 382/107
6,097,394 A * 8/2000 Levoy et al. ................ 345/419
6,130,957 A * 10/2000 Horikoshi et al. .......... 382/107
7,043,056 B2 * 5/2006 Edwards et al. ............ 382/103

OTHER PUBLICATIONS

Honda, et al, "Real Time pose estimation of an object manipulated by multi-fingered hand using 3D stereo vision and tactile sensing" 1998 IEEE/RSJ Int'l Conf. on IntelligentRobots and Systems (Victoria, BC, Oct. 1998) pp. 1814-1819.

Kim, e t al "Three dimensional pose determination for a humaniod robot using binocular head system" Proc. of the 1999 IEEE/RSJ Int'l Conf. on Intelligent Robots and Systems (Victoria, BC, Oct. 1998) pp. 1204-1209.

Lippiello, et al. "A New Method of Image Features Pre-Selection for Real-Time Pose Estimation Based on Kalman Filter", Proc. of the 2002 IEEE/RSJ Int'; Conf. on Intelligent Robots and Systems (Lausanne, SZ, Oct. 2002) pp. 372-377.

(Continued)

*Primary Examiner*—Anand Rao
(74) *Attorney, Agent, or Firm*—Casey August; Anne Vachon Dougherty

(57) ABSTRACT

A system and method to estimate the absolute coarse pose of a rigid body, and more specifically of an individual's head as captured by overhead wide-angle cameras, by integrating position and pose information. Position information ideally includes three-dimensional position information provided by range finders or derived from images captured by multiple cameras. The three-dimensional position information can additionally be employed to determine the anchored viewing ray for the object.

20 Claims, 8 Drawing Sheets

OTHER PUBLICATIONS

Hampapur, et al., "Face Cataloger : MultiScale Imaging for Relating Identity to Location", IEEE Conference on Advanced Video and Signal Based Surveillance, Miami, Florida, Jul. 21-22, 2003.

Hati, et al, "Pose estimation in automated visual inspection using ANN" SMC '89 Conference Proceedings:IEEE International Conference on Systems, man, and Cybernetics, vol. 2 (San Diego, Oct. 1998) pp. 1732-1737.

:Hillenbrand, et al, "Object Recognition and Pose Estimation from 3D Geometric Relations" Fourth Int'l Conf. on Knowledge-Based Intelligent Engineering Systems & Allied Technologies, (Brighton, UK, 2000), pp. 113-116.

Simon, et al, "Real -time 3D pose estimation using a high-speed rangesensor", Proceedings of IEEE Int'; Conf on Robotics and Automation (ICRA '94) vol. 3, May 1994, pp. 2235-2241.

Simard, "Hierarchical Pose Estimation from Range Data for Space Applications", MS Thesis, Dept. of Electrical and Computer Engineering, McGill University, Montreal, Aug. 2002.

* cited by examiner

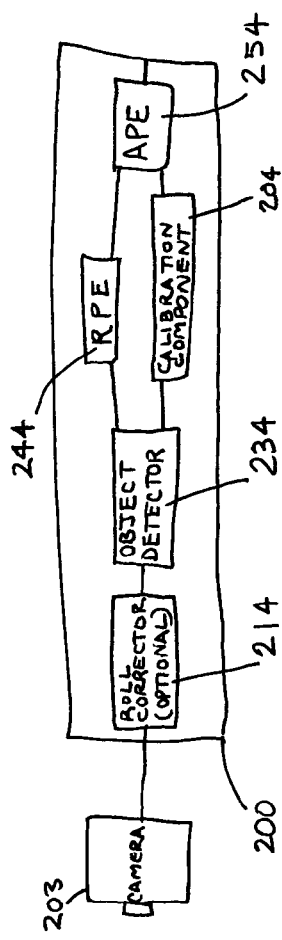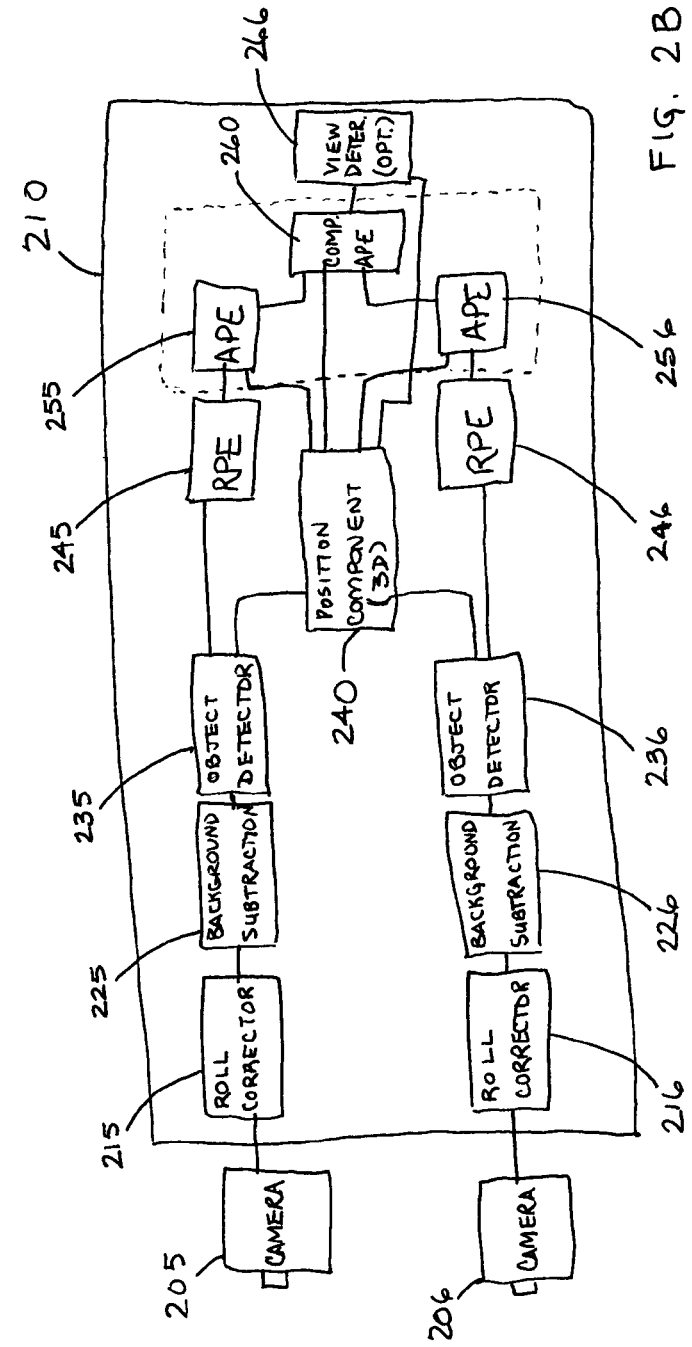

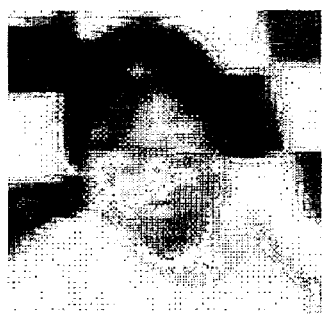  
7A　　　　　　　7B　　　　　　　7C
FIG. 7

SYSTEM AND METHOD FOR PROVIDING POSITION-INDEPENDENT POSE ESTIMATION

FIELD OF THE INVENTION

The invention relates generally to pose estimation for a rigid body. More particularly, the invention is a system and method for computing pose or orientation of the human head or any rigid body while the rigid body is moving around in a three dimensional space as viewed by one or more cameras or is fixedly located at different positions as seen from multiple cameras including wide-angle overhead cameras.

BACKGROUND OF THE INVENTION

For practical applications in retail management and surveillance, overhead wide-angle cameras are used to view the entire scene and to extract global information. The cameras can be used to track people and their traffic patterns. Applications include improving store design and optimizing advertising effectiveness by cataloguing customer behavior in retail stores, providing face cataloguing for surveillance, and providing input for an enhanced reality system. Each of the foregoing applications can benefit from knowledge of the person's activities; and, one of the obvious first steps is to understand the pose of the person. "Pose" is used herein to refer to the direction or orientation that a rigid body is facing.

Overhead wide-angle cameras introduce several challenges to the problem of pose estimation. These challenges include lens distortion artifacts and low-resoluion imagery, particularly of the head. In addition, images from overhead wide-angle cameras introduce a 'virtual' or relative pose that differs from the true pose (i.e., orientation). FIG. 1 shows a composite camera image composed from several images taken by one camera of an individual who is looking in one absolute direction, specifically towards the front wall. The composite image was created by superimposing 4 images, taken from the same camera with fixed orientation, of a person in 4 different locations in the room. The individual is looking in the same absolute direction in all of the images; however, the individual 'appears' to be looking in different directions due to the differences in location with respect to the camera. Specifically, in the different images included in the composite image, the individual appears to be looking down or to the side due to the relative figure orientation with respect to the wide-angle overhead camera. Such apparent differences in pose can lead to inaccurate information being provided for the intended cataloging of customer behavior.

What is needed, and what is therefore an object of the present invention, is a system and method to provide estimation of the absolute pose of a rigid body as seen from different locations with respect to one or multiple cameras, including wide-angle overhead cameras.

It is another object of the invention to provide a system and method to estimate absolute pose of a person's head as the person moves around in a three dimensional space, or when the person is located at different positions, as seen from one or multiple cameras, including wide-angle overhead cameras.

Another object of the invention is to provide a system and method to estimate the absolute pose/orientation and the position in 3D space, thereby estimating the anchored viewing ray, (i.e., for a person, which way are they looking and what is it possible for them to see in the space).

Yet another object of the invention is to provide absolute pose estimation by integration of low-resolution imagery from one or multiple cameras.

SUMMARY OF THE INVENTION

The foregoing and other objects are realized by the present invention that provides a system and method to estimate the absolute coarse pose of a rigid body, and more specifically of an individual's head as captured by one or more than one camera, through integration of 2D or 3D position information and pose information. Position information preferably includes three-dimensional position information provided by range finders or derived from images captured by multiple cameras. The 3D position information further enables anchored viewing direction determination. With only 2D information, it is still possible to estimate absolute pose.

BRIEF DESCRIPTION OF THE INVENTION

The invention will now be described in greater detail with specific reference to the appended drawings wherein:

FIG. 1 is a composite camera image of multiple images showing the apparent difference in the pose of a human figure due to the human figure's different positions with respect to the camera;

FIGS. 2A and 2B provide representative illustrations of a basic system for implementing the present invention (FIG. 2A) and an enhanced system (FIG. 2B) having components to optimize the output;

FIGS. 7A through 7C show images illustrating the effects of virtual tilt, virtual pan, and virtual roll for a single image.

DETAILED DESCRIPTION OF THE INVENTION

Figure 1:

The present invention is implemented using a system and method to integrate camera information, object position, and image-based pose estimation. Specifically the invention will be used to estimate the orientation or pose of the human head, but the method can be applied to estimate the orientation or pose of any rigid body. Hereinafter, the orientation/pose estimation discussion will reference head pose, with the understanding that rigid body pose can be obtained with the same components and processes.

FIGS. 2A and 2B provide representative illustrations of a basic system for implementing the present invention (FIG. 2A) and an enhanced system (FIG. 2B) having components to optimize the output. FIG. 2A illustrates a single camera 203 providing output to the absolute pose estimation system 200. The camera output can be corrected for roll at component 214 thereby yielding a roll-corrected camera output. It is here to be noted that roll correction is optional, though it improves the result. Furthermore, roll correction can be undertaken, as illustrated, on the incoming camera image information or can be performed on the relative pose estimation output when determining an absolute pose estimate. The roll-corrected camera output is then analyzed at the object detection component 234 to find the location of the desired object within the corrected camera image. The object detection output is provided both to the relative pose estimator 244 and the position component 204. Using known information regarding the camera orientation relative to the environment as well as the object image location information, calibration component 204 provides a viewing line estimation of the 2D position of the object. The 2D object position information is provided to the absolute pose estimator 254. The relative pose estimator 244 classifies the pose of the located object by comparing a trained image-based model on the relevant image information to estimate the out-of-plane rotation of the object within the camera image. The output of the relative pose estimator (hereinafter the "relative pose estimate") is combined with the object position information in the absolute pose estimator 254 to yield the absolute pose estimate.

With only a single camera, or multiple cameras in which wide baseline stereo is not possible, it is still possible to estimate absolute pose given camera calibration information per camera. After the object is detected, relative pose is estimated from the appropriate region of the image for each camera. This relative pose can be corrected based on the orientation of the camera and the position of the object region in the image to obtain the absolute pose estimation. Although the distance of the object from the camera is not known, from the location of the object region in the image, it is known that the object lies on a specific 3D line in the world coordinate system which is henceforth referred to as the "viewing line". If the object lies directly in front of the camera and its image lies in the center of the image (assuming the center of the image is the center of the camera view), the viewing line is perpendicular to the image plane and the relative pose estimate requires no correction. Given the angle of the viewing line with respect to the optic axis, the relative pose can be transformed to the world coordinate system. All cameras should agree on absolute pose so the best final estimate of absolute pose from multiple cameras can be computed using a maximum likelihood estimation or other optimization scheme, such as least squares, which minimizes the error in each estimate.

As representatively illustrated in FIG. 2B, multiple overhead wide-angle cameras 205 and 206 can be positioned to capture the relevant space and provide output to the absolute pose estimation system 210. The cameras need not be wide-angle cameras that are mounted overhead; however, since images from overhead wide-angle cameras exhibit the shortcomings of the technology, they provide a challenging representative implementation. Clearly more than two cameras can be used, with the outputs of all cameras being independently processed and then combined at the composite absolute pose estimator 260, as further detailed below.

Within the absolute pose estimation system 210, the image signal output of each camera is provided to a component, shown as 215 and 216, for roll correction, which is an optional step. Thereafter the roll-corrected signals are provided for background subtraction at components 225 and 226 and for object detection at components 235 and 236 to obtain object position information. Once the desired object has been detected, each object location information signal is provided to one of the relative pose estimators, shown as components 245 and 246. The relative pose estimators each output a relative pose estimate, or probability distribution of pose, for the object in the associated camera image and provide that output for absolute pose estimation.

In the multiple camera embodiment, position information is further refined by integrating the object image location information obtained from each of the object detection components with the known camera orientation information to obtain the 3D object position. In the illustrated embodiment, the object detection output is provided to a 3D position determining component, such as the illustrated triangulation component 240, that determines the 3D position of the object using the object location information output from each of the object detection components as well as the known camera orientation information. As will be apparent to those having skill in the art, components and methods other than triangulation of object position information from cameras of known orientation can be used to produce the 3D position output. For example, 3D position output can be obtained from one or more range finders using lasers or ultrasound technology within the space and then provided to the absolute pose estimator along with the relative pose estimates. In addition, it should be noted that, for triangulation based on two cameras and, an orthogonal relationship between the two cameras is optimal.

In the illustrated embodiment, the relative pose estimates and the 3D object position information derived for each camera are provided to absolute pose estimation components 255 and 256 to yield absolute pose estimates for each camera. Absolute pose estimates effectively correct the relative pose estimates for pan and/or tilt errors, discussed further below, to provide the absolute pose estimates. It is here that roll correction can also be implemented if not performed earlier. Thereafter, the multiple absolute pose estimation signals for the multiple cameras are integrated with the 3D position information at the composite absolute pose estimator 260 to produce a single absolute pose estimate for the object in the space. In fact, all of the absolute pose estimation can be performed in one step, by one component, given the relative pose estimates and the 3D position information. Multiple components are illustrated simply to provide the most thorough of explanations.

The absolute pose estimation can be followed by a view determination component 266, which combines the 3D position information with absolute pose, to determine the anchored viewing ray (or line of sight) of the detected object. Knowing the 3D position of the object (i.e., the position of the person's face relative to the environment) and the orientation (i.e., absolute pose estimate) thereof, the view determination component is able to estimate what is within the person's field of view.

It is here to be noted that, while duplicate components are illustrated for camera output processing, the functionality of duplicate components may be implemented in a single component, and the functionality of multiple components (e.g., the object detector and relative pose estimator) may be implemented in combination components, provided that each camera's signal output is independently processed until its arrival for absolute pose estimation (by one or more absolute pose estimate components). The illustrated composite absolute pose estimator component 260 integrates the 3D position information from the 3D position component, illustrated triangulation component 240 and the pose estimate information in order to arrive at the single composite absolute pose estimation.

Figure 3A:
FIGS. 3A and 3B show a composite image (FIG. 3A) and a graphic representation (FIG. 3B) of three dimensional position and pose tracking of an individual as she walks around a space.
Figure 3B:
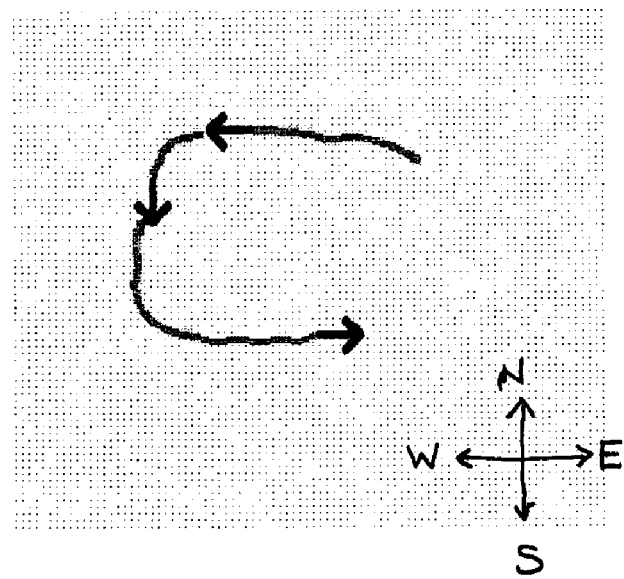

The invention provides a solution to estimate absolute coarse pose for moving objects or objects seen at varying positions by integrating position information and pose information. FIGS. 3A and 3B show an example of the output of the embodiment of the system shown in FIG. 2B. As a person walks around the space, their 3D location is recorded along with the absolute cardinal direction of their pose (i.e., north, east, south or west). The pose refers to which direction they are facing. If body pose estimation is desired, "pose" refers to the body direction, whereas if head pose estimation is desired, "pose" refers to the direction to which the head is turned regardless of body position. The 3D implementation allows not only body pose estimation, but can also be utilized to estimate the object's pointing ray (i.e., person's sight line) to determine at which external point within the space the object is pointing (i.e., what it is that the person is most probably looking at).

Under a representative implementation of the present invention, each image-based object detector, preferably a head pose classifier, 245 and 246 of FIG. 2B, is trained to estimate 12 pan poses from 0 degrees to 360 degrees using the training data from an unrelated camera. The training data comes from an unrelated camera so that any arbitrary camera configuration can be used. In order to obtain the absolute head pose and to correct the "virtual pose" phenomenon that results from overhead wide-angle cameras, as illustrated in FIG. 1, the 3D head position is calculated based on a wide-baseline stereo method. The image phenomena due to camera orientation include tilt, pan, and roll, which refer to the head looking up/down (tilt), left/right (pan), and the rotation along the optic axis (roll), are corrected.

Each object detector, such as a shape-based head finder, 235 and 236 of FIG. 2, detects the 2D position of the desired object for each calibrated overhead wide-angle camera. The 2D object position information combined with calibration information is used to calculate the 3D object position via triangulation. The detected relative pose of the 2D image is corrected for roll error, at 215 and 216, based on camera calibration information for each camera and is fed to the trained relative pose estimator to arrive at the camera-based object pose. The absolute object pose for each camera can be obtained by correcting the camera-based object pose from the "virtual pose" which is computed based on the 3D object positions (i.e., the pan and/or tilt correction) at 255 and 256. Given an estimate of absolute object pose from each camera and the 3D position of the head, composite absolute pose estimation is performed for the final result. Weighted maximum likelihood estimation will produce an improved final result, with weighting factors such as the proximity of certain cameras taken into account.

Figure 4:
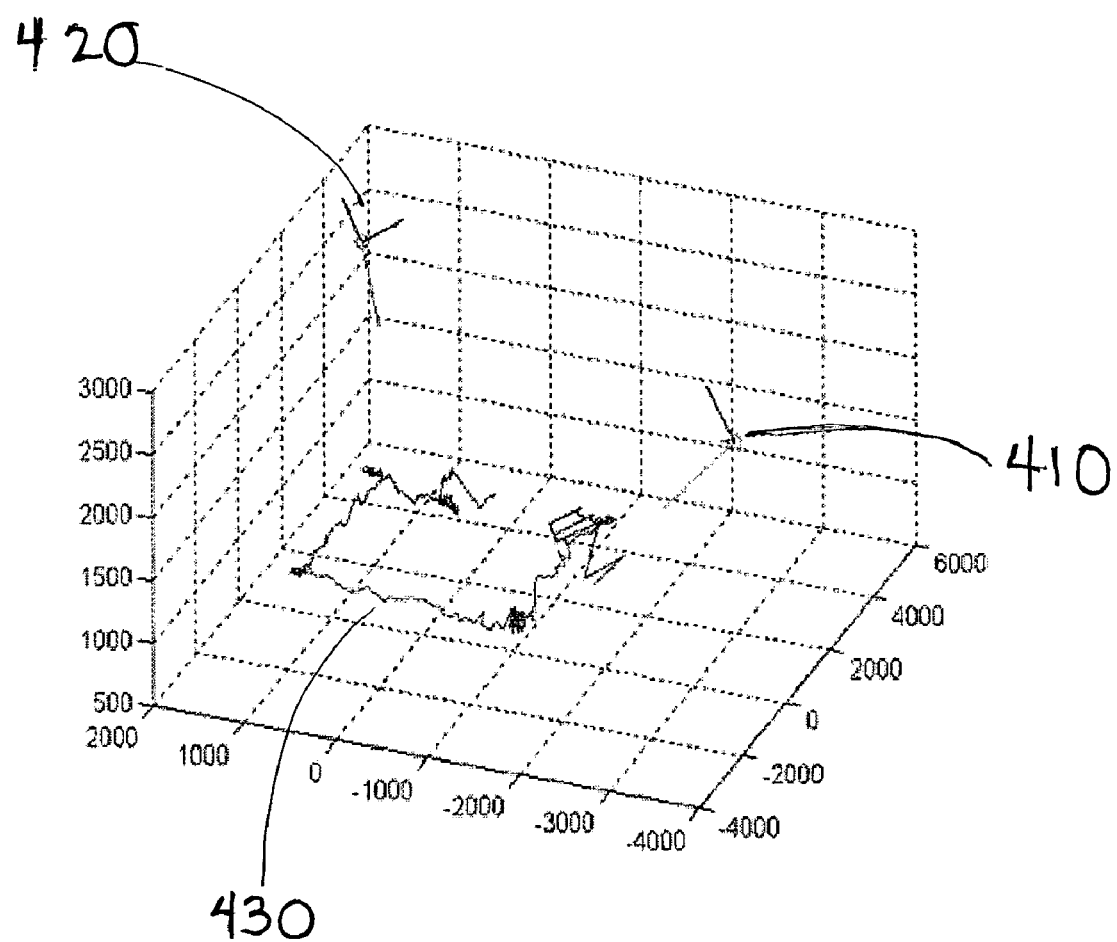
FIG. 4 is a three dimensional graph showing the positions of two cameras and plotting the path an individual takes as she walks around the space.

The 3D people tracking system, which is used to drive a face cataloguer and position-based video retrieval, is based on wide-baseline stereo control of multiple active cameras to enable continuity of identity. Each path of an individual moving in the space is associated with close-up images of the particular person, allowing one to determine "who is where?" at any point of time. As noted above, FIGS. 3A and 3B illustrate 3D position tracking of a person walking around the space. FIG. 4 provides a 3D graph showing the positions (in mm) of the two cameras, the cameras' orientations, and the path a person took walking around the room (center). The coordinate system 410 of camera 1 is shown to the right in FIG. 4, while the coordinate system 420 of camera 2 is shown in the upper left corner. The illustrated path 430 is derived by the triangulation component.

Figure 5:
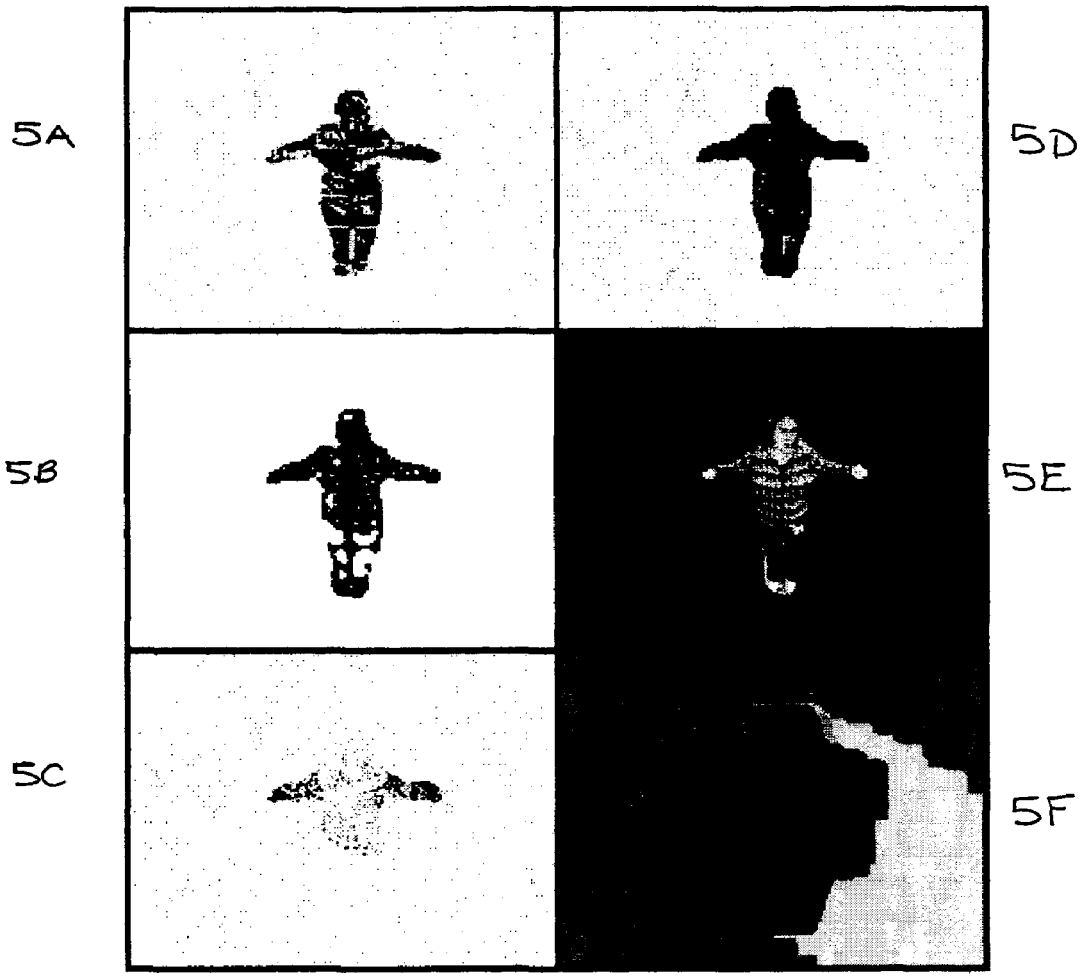
FIGS. 5A through 5F illustrate processing for background subtraction.

At components 225 and 226, the background subtraction modules evaluate differences in color, texture, and motion throughout an image and use the information to improve the detection of objects in cluttered environments. Background subtraction is illustrated in FIGS. 5A through 5F wherein FIG. 5A illustrates differences in color, FIG. 5B illustrates differences in texture, and FIG. 5C illustrates differences in motion. The resulting saliency map shown in FIG. 5D is smoothed using morphology-like operators, after which small holes and blobs are eliminated to generate a clean foreground mask as shown in FIG. 5E. The background subtraction module utilizes a number of mechanisms to handle changing ambient conditions and scene composition. Ideally, it continually updates its overall RGB channel noise parameters to compensate for changing light levels, estimates and corrects for AGC and AWB shifts induced by the camera, and it maintains a map of high activity regions (as indicated by FIGS. 5C and 5F) with slow updating of its background model only in areas deemed as relatively quiescent.

Figure 6A:
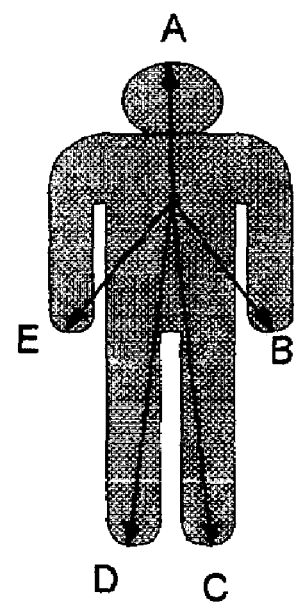
FIGS. 6A through 6C illustrate a silhouette and the mapping thereof for head detection under the present invention.
Figure 6B:
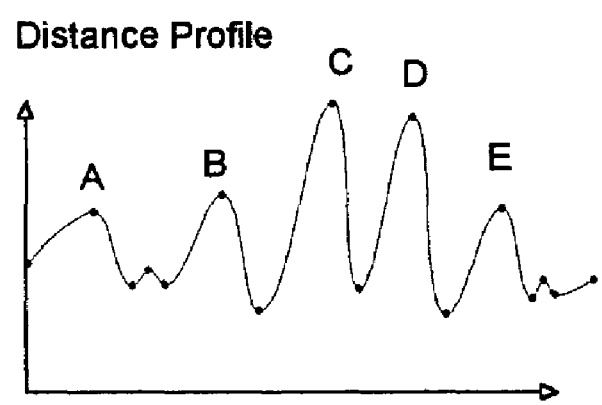
Figure 6C:
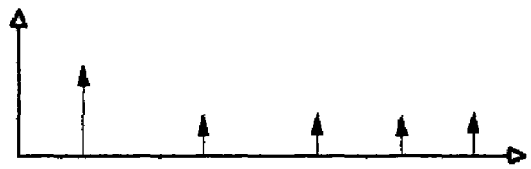

After background subtraction has been conducted, head detection is performed. Head detection uses the smoothed silhouette of the foreground object, preferably after it has been segmented using background subtraction. To interpret the silhouette, a simple human body model is preferably used, the simple model consisting of six body parts including head, abdomen, two hands, and two feet as shown in FIG. 6A. First, a one-dimensional "distance profile" is generated, representing the distance from each contour pixel to the contour centroid, in the illustrated example following the contour clockwise. The distance profile is parsed into peaks and valleys based on the relative magnitudes of the successive extreme, as shown in FIG. 6B. The peaks of the distance transform are used to hypothesize candidate locations of the five body parts: the head, two feet, and two hands. Determination of the head among the candidate locations can use a number of heuristics based on the relative positions of the candidate locations and the curvatures of the contour at the candidate locations, which curvatures are mapped in FIG. 6C. More specifically, the following objective function may be used to determine the location of the head:

$$O_i = (Y_i - Y_c) + w_x * |(X_c - X_i)| + w_r * R_i - w_e * E_i,$$

where $(X_c, Y_c)$, $(X_i, Y_i)$ denote the coordinates of the centroid of the body contour and center of the circle fitted to the contour segment associated with $i^{th}$ peak. $R_i, E_i$ denote radius and residue of least square fitting of the $i^{th}$ circle. $w_x(=1)$, $w_r(=1)$, and $w_e(=10)$ are weights associated with the three components of the objective function. The objective function hypothesizes that smaller, more circular extremes are more likely to be heads. Similarly, the circles that are higher and vertically more aligned with the center of the body are presumed to be heads.

In the FIG. 2B embodiment, based on the 2D head position in each image and the camera orientation and calibration information, the 3D head position is derived by the triangulation component using a wide baseline stereo method. The wide baseline stereo method optimizes the similarity between the 2D shape and color histograms while minimizing triangulation error based on calibration information.

The head pose estimation for overhead wide-angle cameras needs to correct for "virtual pose" using the 3D head and camera positional information. The imagery from two cameras and their relative geometry are used to improve performance. FIGS. 7A through 7C show instances of virtual tilt (FIG. 7A), virtual pan (FIG. 7B), and virtual roll (FIG. 7C).

Virtual tilt is computed based on the camera origin $$\frac{1}{c}$$

and the position of the person's head $$\frac{1}{h}.$$

From these positions, the epipolar line is computed:

$$\overset{r}{e} = \overset{1}{h} - \overset{r}{c}.$$

It is assumed that the cardinal directions (or the directions of interest) align with those of the x and y axes of the identity matrix in the world coordinate system. Virtual tilt $\theta_x$ is the angle between the epipolar line and the z-axis:

$$\theta_x = \cos^{-1}\left(\frac{\overset{r}{e} \cdot [0, 0, 1]^t}{\|\overset{r}{e}\|}\right)$$

It is to be noted that, since virtual tilt refers to tipping the head up or down, it is with respect to some direction of the face. Hence, if a person is turned with respect to the camera, virtual tilt is a tip of the head in this direction. The inventive system is trained only on a fixed tilt ($\theta_x=10°$) with respect to the frontal face.

Virtual pan $\theta_y$ can be computed similarly to virtual tilt using the complement of the angle between the epipolar line and the y-axis of the world coordinate system:

$$\theta_y = \cos^{-1}\left(\frac{\overset{r}{e} \cdot [0, 1, 0]^t}{\|\overset{r}{e}\|}\right).$$

Virtual roll $\theta_z$, is computed based on the angle between the vertical axis of the world coordinate system projected onto the camera's image plane and the vertical axis of the camera system:

$$\theta_z = \cos^{-1}\left(\frac{(R*[0, 0, 1]^t + T) \cdot [0, 1, 0]^t}{\|R*[0, 0, 1]^t + T\|}\right)$$

where (R, T) represent the rigid transformation from the world coordinate system to the camera coordinate system.

Figure 8:
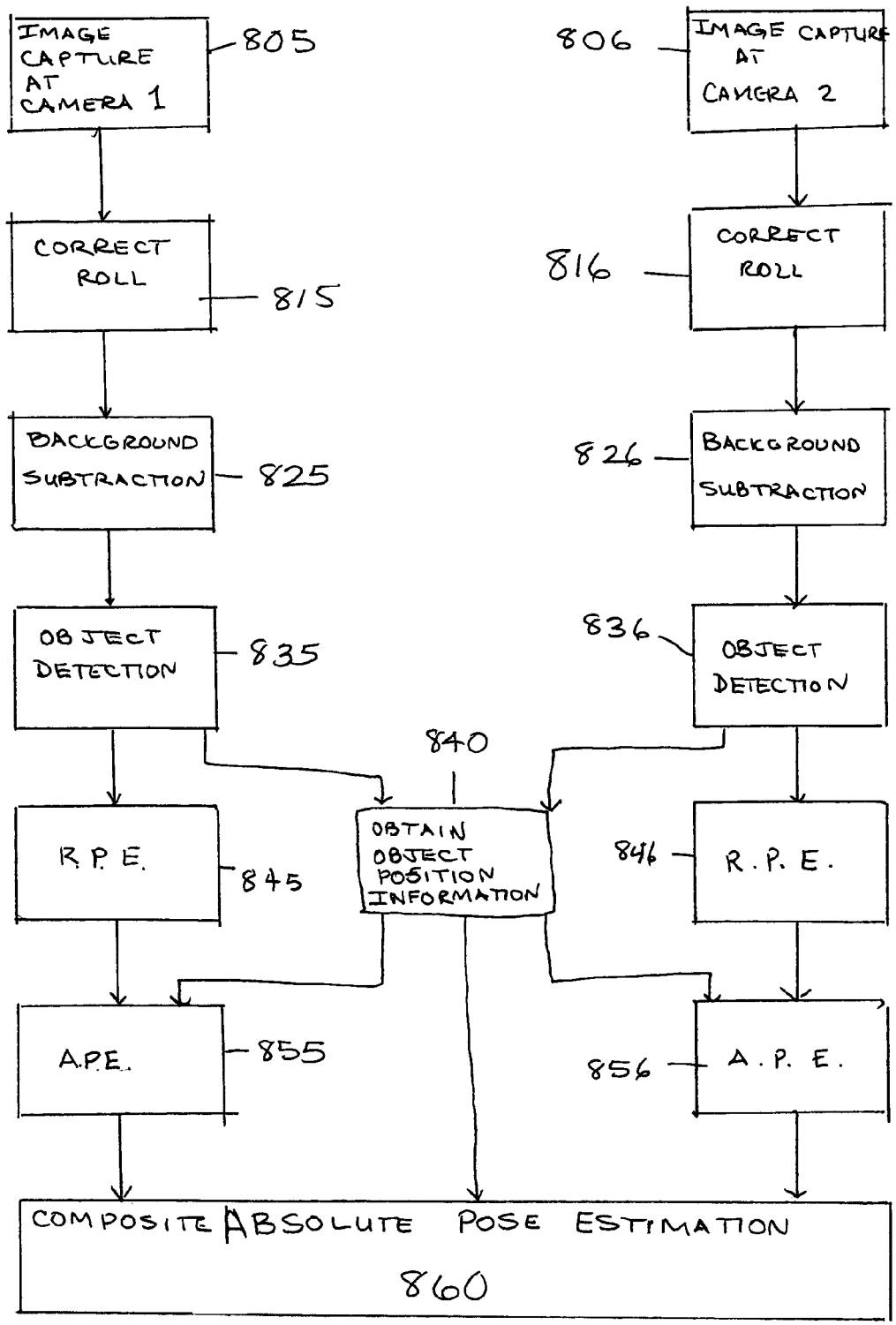
FIG. 8 depicts a representative process flow for estimation of absolute head pose for two cameras.

FIG. 8 provides a flow chart of the process used to estimate absolute pose by an arbitrary multiple camera configuration system. The Figure tracks the process for two cameras, Camera 1 and Camera 2, but clearly could be expanded to include k cameras, where k is $\geq 2$. Each camera captures the image and provides output to the absolute pose estimation system at steps 805 and 806. Each camera has been independently pre-calibrated. Based on the calibration information, each camera corrects for virtual roll using image rotation at steps 815 and 816. Thereafter the system performs background subtraction, at 825 and 826, and object detection to locate the object in each image at 835 and 836. A neural network-based head pose classifier, or other relative pose estimation component, for each camera then performs relative pose estimation at steps 845 and 846. The estimation is referred to as 'relative' pose estimation, because at this point, the algorithm estimates pose based on appearance only for each camera.

Object position information is derived at step 840, for example by triangulation through intersecting lines of sight from each camera to the object. The 2D viewing line estimation (for single camera embodiments) or 3D (for multiple camera embodiments) position output is provided as input for absolute pose estimation. As noted above, methods other than triangulation can be employed to provide the 3D position information, for example those methods detailed in "Face Cataloger: MultiScale Imaging for Relation Identity to Location" IEEE Conference on Advanced Video and Signal Based Surveillance, (July, 2003) by A. Hampapur, et al, the teachings of which are incorporated by reference herein. Based on the camera calibration information and the position outputs, the system can now correct for virtual pan of tilt at steps 855 and 856 to obtain an estimate of absolute pose for each camera. Given an estimate of absolute pose from each camera, maximum likelihood estimation is performed at step 860 to obtain the final absolute head pose. Clearly step 860 is not needed if only a single cameras output is available.

The maximum likelihood estimation is based on the knowledge that the multiple views of the head are seen from multiple cameras with known geometry, and thus the angle between the views is known. The final estimate of pose maximizes the likelihood that both cameras are viewing this pose from their respective vantage points. The probability distribution $P(Z_k|\theta)$ of an image observation $Z_k$ for the $k^{th}$ camera given a specific pose $\theta$, depends on camera noise, lighting variations, individual variations, etc. The majority of these factors are independent for each camera. Therefore, the joint probability is modeled as the product of the individual distributions:

$$P(Z_1, Z_2 \ldots Z_n|\theta) \approx \prod_{k}^{n} P(Z_k | \theta).$$

The output of each individual pose estimator (e.g., the output from steps 855 for Camera 1) is inversely weighted by the distance of the head from that camera. In this way, the system can bias the output based on the closer camera.

The invention has been described with specific reference to several preferred embodiments for using position information to correct for virtual pose, combining multiple images with absolute pose estimates to come up with a final absolute, position-independent pose. It will be apparent to one having skill in the relevant art that modifications can be made without departing from the spirit and scope of the invention as set forth in the appended claims.

The invention claimed is:

1. A system for providing absolute orientation estimation of an object viewed by at least one camera in a space, the system comprising:

a. one or more cameras, each having a known camera orientation with respect to the space;

b. at least one detection component for detecting the object within one or more camera images and for providing object image location information;

c. at least one relative orientation estimation component for estimating the relative orientation of said object within each camera image using the object image location information; and d. at least one absolute orientation estimation component for integrating the object image location information and the relative orientation estimate to produce an absolute orientation estimate.

2. The system of claim 1 further comprising at least one position determination component for providing the 3D object position information representing the position of the object in the space.

3. The system of claim 2 further comprising a view determination component which derives an anchored viewing ray of the object from said absolute orientation estimation and said 3D object position information.

4. The system of claim 2 wherein multiple cameras are viewing said object and wherein said 3D object position component derives 3D object position information using wide baseline stereo analysis.

5. The system of claim 2 wherein said position component comprises at least one range finder.

6. The system of claim 1 further comprising at least one roll correction component for correcting roll for the images obtained for each camera.

7. The system of claim 2 further comprising a composite absolute pose estimation component for integrating the absolute orientation estimates from each of said plurality of cameras and said 3D position information into a composite absolute orientation estimate.

8. The system of claim 1 wherein said at least one detection component additionally comprises means for performing background subtraction on each of said images.

9. The system of claim 4 wherein said wide baseline stereo analysis is provided by a triangulation component.

10. A method for providing absolute pose estimation for an object in at least one image captured by at least one camera comprising the steps of:

a. receiving at least one camera image from one or more cameras positioned at known camera orientations with respect to the space;

b. detecting the object within one or more camera images c. providing object location information based on said detecting;

d. providing object position information representing the position of the object in the space;

e. estimating the relative pose of said object within each camera image using the object location information; and f. integrating the object position information and the relative pose estimate to produce an absolute pose estimate for each camera.

11. The method of claim 10 wherein said providing object position information comprises deriving said object position information using the object location information and camera orientation information.

12. The method of claim 11 wherein said deriving comprises estimating a 2D line for the position of the object.

13. The method of claim 11 wherein multiple cameras are viewing said object and wherein said deriving comprises deriving 3D object position information using wide baseline stereo analysis.

14. The method of claim 11 wherein multiple cameras are viewing said object and wherein said deriving comprises providing 3D object position information.

15. The method of claim 14 wherein said position component comprises at least one range finder.

16. The method of claim 10 further comprising correcting roll for the images obtained for each camera.

17. The method of claim 14 further comprising integrating absolute pose estimates from each of said plurality of cameras and said 3D position information into a composite absolute pose estimate.

18. The method of claim 10 additionally comprising performing background subtraction on each of said images prior to said detecting.

19. The method of claim 14 further comprising deriving an anchored viewing ray based on said absolute pose estimate and said 3D object position information.

20. A program storage device readable by machine tangibly embodying a program of instructions for said machine to execute a method for providing absolute pose estimation for an object based on images captured by at least one camera in a space, said method comprising the steps of:

a. receiving at least one camera image from one or more cameras positioned at known camera orientations with respect to the space;

b. detecting the object within one or more camera images c. providing object location information based on said detecting;

d. providing object position information representing the position of the object in the space;

e. estimating the relative pose of said object within each camera image using the object location information; and f. integrating the object position information and the relative pose estimate to produce an absolute pose estimate for each camera.

* * * * *